United States Patent

[11] 3,552,411

[72] Inventor  Abraham Branitzky
    279 W. 154th St., Harvey, Ill. 60426
[21] Appl. No. 756,231
[22] Filed Aug. 29, 1968
[45] Patented Jan. 5, 1971

[54] FREEZE PROTECTOR
    15 Claims, 6 Drawing Figs.
[52] U.S. Cl. .................................................. 137/60, 73/277
[51] Int. Cl. ............................................ G01f 15/10
[50] Field of Search .......................................... 137/59-
    —62; 138/27, 32; 123/41.14, 41.15, 41.5; 237/80;
    220/89A; 73/277

[56] References Cited
    UNITED STATES PATENTS
953,199   3/1910   Gamon ........................... 138/27

| 1,473,562 | 11/1923 | Jonsson ........................ | 137/60 |
| 1,878,238 | 9/1932 | Holmes ........................ | 138/32X |
| 2,518,827 | 8/1950 | Smith ............................ | 220/89X |
| 2,995,140 | 8/1961 | Managhan ..................... | 123/41.15X |

FOREIGN PATENTS 257,263   3/1965   Australia ..................... 73/277

Primary Examiner—M. Cary Nelson
Assistant Examiner—Richard Gerard
Attorney—Milton Robert Kestenbaum ABSTRACT: The bottom plate of a meter body has a compartment communicating with the main internal cavity of the meter. The compartment also communicates with the exterior through an opening in the bottom plate. This opening is closed off by a plate or plug having a substantially higher heat conductivity than the meter body.

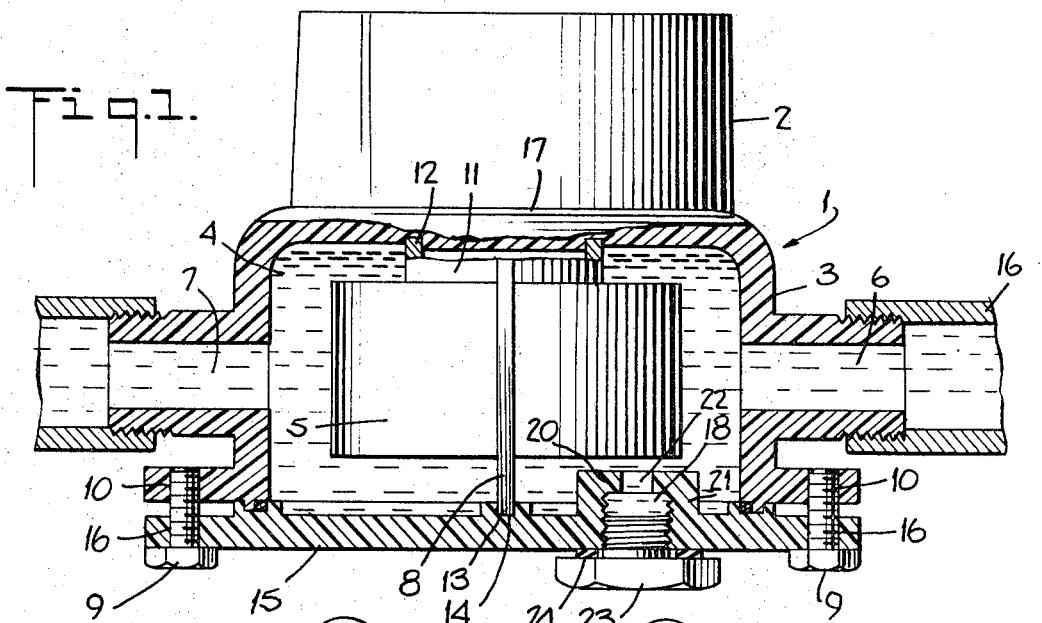
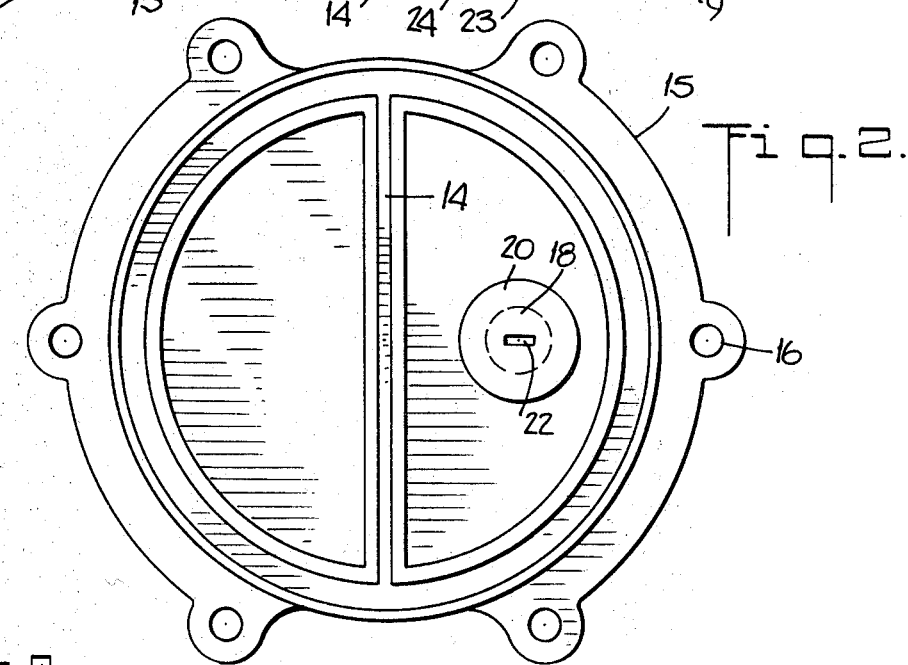
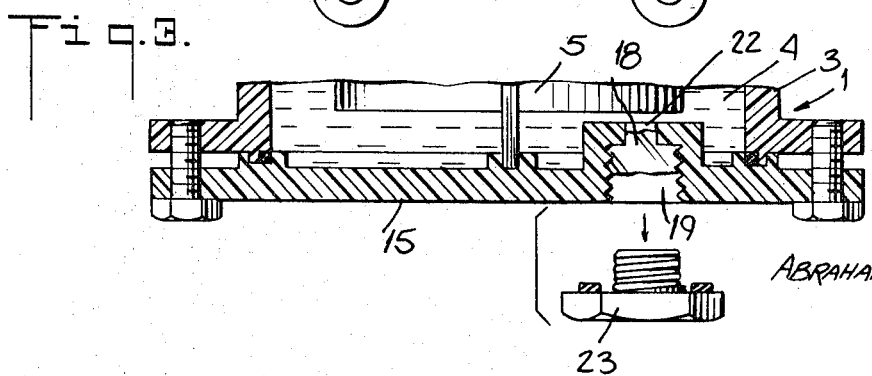

INVENTOR.
ABRAHAM BRANTZKY

FREEZE PROTECTOR

This invention relates to liquid meters and more particularly to means for protecting the internal mechanism of the meter from damage due to freezing of the metered liquid.

In liquid meters for use in cold climates an important design consideration is the provision for the relief of the pressure built up within the meter by the expansion of metered liquid, such as water, if it should freeze. Without such provision, the meter may be severely damaged.

It is well known that water when frozen increases in volume and that the expansion due to the transformation is practically irresistible. The result is that when water freezes in a closed vessel the vessel will be likely to be destroyed unless some provision is made to save the essential or operative parts thereof under the stress, as by providing some part designedly made to yield or break when the stress exceeds that which the part designed to yield will normally withstand.

It is now the practice to provide a frangible bottom for the water meter casing, which in the event of freezing breaks to relieve the pressure and permit further expansion. This practice in addition to being laborious is costly in that the broken bottom has to be replaced each time the water meter freezes.

A frost plate for a meter of this type is generally in the form of a concave-convex base plate having lugs formed integrally therewith by which the frost plate is secured to the meter casing. The strength of the juncture of these mounting lugs with the base plate determines the pressure at which the frost plate will break, breakage occurring by the severing of the main portion of the plate from the lugs at their juncture.

Another form of frost protection is the provision of a flexible diaphragm peripherally clamped by a cover over an access opening formed in the meter casing. This form of protection relies upon the flexibility of the diaphragm and the cushioning effect of the air chamber between the diaphragm and the clamping cover to accommodate expansion of the liquid as it freezes.

Still other meters employ bolts which secure the bottom plate of the meter to the meter casing and which break when the pressure within the meter due to freezing exceeds 500 p.s.i.

In each of these forms, frangible frost plate, breakable bolts, a diaphragm and in other forms as well, freezing is allowed to occur within the principle cavity in the meter casing. The fluid in the meter cavity above and around the measuring chamber is allowed to freeze; so too is the fluid allowed to freeze between the measuring chamber and the frost plate. As a result, the measuring chamber is frequently damaged by the pressure of the freezing liquid.

A principle object of the present invention is to provide a relatively simple, inexpensive and effective means for preventing stresses due to freezing from being applied to the internal mechanism.

Further amplified, it is an object of the present invention to provide a means to localize the freezing within a liquid meter so that freezing occurs at a predetermined location which does not exert a pressure on the internal workings of the meter.

A further object of the present invention is to localize the stresses due to freezing between the bottom plate of the meter and a pressure-relieving member to preclude the damaging application of such stresses upon the internal mechanism of the meter.

An additional object of the present invention is to take advantage of the difference in heat conductivity between dissimilar materials, such as for example, between plastic and iron, to control the initial freezing of the fluid within a liquid meter.

Another object of the present invention is to provide a freeze protection device for liquid meters wherein expansion due to freezing is relieved without the distinction of a frangible bottom plate.

These and other objects and the features of the invention will be made clear from the following detailed description taken together with the accompanying drawings in which:

FIG. 1 is a side elevation of a liquid meter with the lower portion broken away to show a bottom plate having a freeze compartment and freeze plug according to the invention;

FIG. 2 is a plan view of the bottom plate shown in FIG. 1;

FIG. 3 shows the bottom plate with the freeze plug falling away to relieve the localized freezing stress in accordance with the invention;

Figure 4:
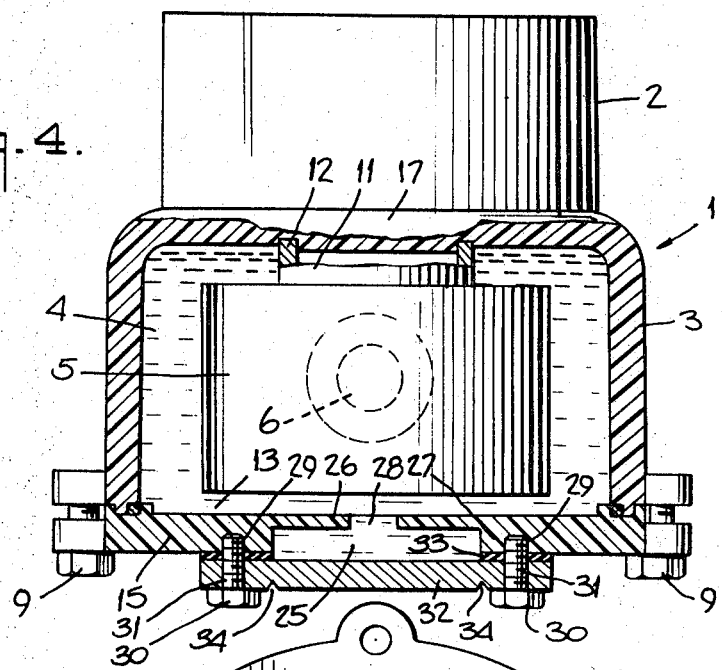
FIG. 4 is a side elevation of a liquid meter showing a second embodiment of the invention in the form of a weekened freeze plate secured to the bottom plate.

Referring to FIGS. 1 and 2, a liquid meter, in this case a water meter, shown generally at 1, has an upper register portion 2 and a lower casing portion 3 having a central cavity 4 containing a centrally located measuring chamber 5. The meter has an inlet channel 6 and an outlet channel 7 communicating with the central cavity 4. A pair of vertical barriers 8 extend from the measuring chamber 5 to fit into grooves (not shown) in the cavity walls so as to divide the cavity into an inlet chamber and an outlet chamber to ensure that all fluid entering the cavity through the inlet channel 6 will pass through the measuring chamber 5 before exiting through the outlet channel 7.

The inlet and outlet chambers are sealed at the top by the insertion of annular ring 11 on the measuring chamber 5 in the annular groove 12 in the roof of the cavity. Sealing at the bottom is effected by the horizontal barrier 13 which extends from the bottom of the measuring chamber 5 to fit in the horizontal groove 14 in the meter bottom plate 15. The bottom plate 15 is secured to the meter casing by bolts 9 which pass through lug holes 16 and into aligned threaded holes 10 in the meter casing 3. Rotation of the measuring element within the measuring chamber 5 is transmitted to the register by magnetic coupling across the barrier 17.

A compartment 18, having top wall 20 and sidewalls 21 extends into the cavity 4 from the bottom plate 15. A threaded hole 19 passes from the exterior through the bottom plate 15 and communicates with the compartment 18. A slot 22 passes from the internal cavity 4 through the top wall 20 and communicates with the compartment 18.

A freeze plug 23 is screwed tight in the threaded opening 19 against a gasket 24. The bottom plate 15 is formed of a hard, brittle plastic material. The meter casing 3 is formed of a strong plastic material. The freeze plug 23 is iron, having a substantially higher heat conductivity than the casing and the bottom plate.

Referring in addition to FIG. 3, the freeze plug functions as follows. When the meter is connected to the fluid source, such as the street main, water will enter and fill the central cavity 4. Water from the cavity 4 will also enter and fill the compartment 18 through the slot 22. When freezing conditions occur in the environment surrounding the meter, the heat of the water in the compartment 18 will be drawn off faster than the heat of the water elsewhere in the meter. This occurs because the freeze plug 23 is metal whereas the casing 3 and the bottom plate 15 are plastic and appreciably poorer heat conductors. Hence the water in the compartment 18 will freeze first. Stated another way, freezing is localized to the water in the compartment 18.

Upon freezing, the water in the compartment 18 will expand and either break the internal threads on the hole 19 of hard, brittle bottom plate 15 or the external threads on the freeze plug 23.

The water in the meter is under pressure from the main in the street. When the threads on the freeze plug 23 or the hole 19 break, this pressure will force the freeze plug 23 and the ice in the compartment 18 to drop out of the bottom plate 15. The water will run out of the meter through the slot 22. So long as the water runs, the water in the cavity 4 will be prevented from freezing. The internal mechanism, the measuring chamber 5, will not be subject to freezing stresses.

Moreover, so long as the water runs, the pipes 16 from the main which run to the meter are also protected from freezing. One need only change the bottom plate 15 at relatively small cost to restore the meter to usefulness.

It is also possible to weaken the threads on the freeze plug 23 so that they will yield and be stripped from the plug at the requisite pressure. In this way the bottom plate 15 can be saved for reuse by removing the stripped threads and inserting a new freeze plug 23.

Figure 5:
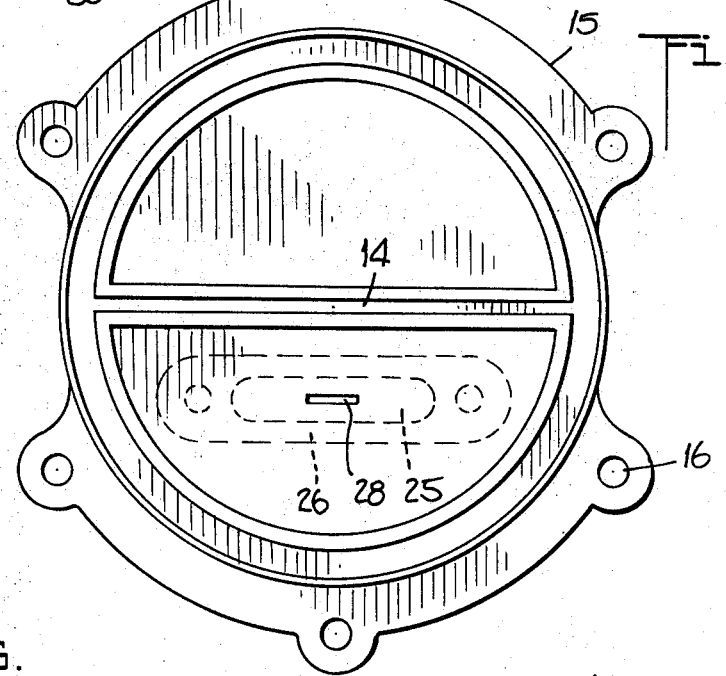
FIG. 5 is a plan view of the bottom plate shown in FIG. 4.

Referring to FIGS. 4 and 5, a second embodiment is shown in which similar parts bear the same reference numbers as the first embodiment. In this second embodiment, a compartment 25, has a top wall 26 and side walls 27 in the bottom plate 15. A slot 28 passes from the internal cavity 4 through the top wall 26 and communicates with the compartment 25. The compartment 25 is itself a larger slot shape which extends to and opens upon the exterior of the bottom plate 15.

Threaded blind holes 29 extend into the bottom plate 15 beyond each end of the compartment 25. Bolts 30 pass through holes 31 in a freeze plate 32 to hold the freeze plate 32 flush against a gasket 33 so as to completely and tightly close off the compartment 25. The freeze plate has a weakening groove 34 located at each end of the compartment 25.

The freeze plate 32 is frangible metal, such as cast iron. The casing, the bottom plate 15 and the bolts 30 are formed of strong plastic. The heat conductivity of the freeze plate 32 is substantially higher than the casing the the bottom plate.

Figure 6:
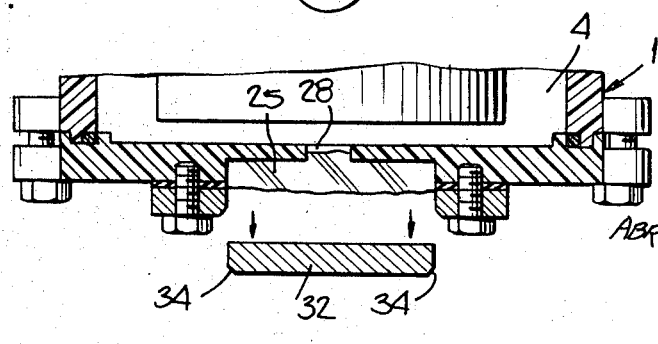
FIG. 6 shows the bottom plate with the freeze plate broken and falling away to relieve the localized freezing stress in accordance with the invention.

Referring in addition to FIG. 6, the freeze plate functions as follows. As described in connection with the first embodiment, water will fill compartment 25 from cavity 4 through slot 28. When freezing conditions occur the heat of the water in the compartment 25 will be drawn off faster than elsewhere in the meter and the initial freezing will be localized to the water in the compartment 25.

When this water expands in the freezing process, the frangible freeze plate 32 will break at one or both of the weakening grooves 34. The freeze plate will bend away from the compartment or drop away entirely, followed by the ice from the compartment 25 and water from the cavity 4 above it.

I claim:

1. In a casing having a cavity for receiving a freeze-expanding fluid:
  a mechanism within said cavity to be protected from freezing stresses;
  means for localizing the initial freezing of said fluid to a predetermined region communicating with said cavity including barrier means for substantially isolating said predetermined region from the portion of said cavity containing said protected mechanism, and adapted to prevent the stresses developed in said initial freezing from being applied upon and within said protected mechanism; and
  means responsive to said initial freezing for opening said region to the exterior to said casing.

2. In a casing according to claim 1 wherein said freeze localizing means comprises means for carrying heat away from said predetermined region faster than from said cavity.

3. In a casing according to claim 1 wherein said freeze localizing means comprises at least two materials of dissimilar heat conductivity, the material of higher heat conductivity contacting said predetermined region and the material of lower heat conductivity contacting said cavity.

4. In combination with a casing having a cavity for receiving a freeze-expanding fluid and a mechanism within said cavity to be protected from freezing stresses, freeze protection means comprising compartment means communicating with said cavity and capable of being opened to the exterior to said casing, said compartment means being substantially isolated from the portion of said cavity containing said protected mechanism to prevent the freezing stresses developed in said compartment means from being applied upon and within said protected mechanism, and means for closing off said compartment means from said exterior having a higher heat conductivity than said casing and adapted to open said compartment means to said exterior upon freezing of said fluid in said compartment means.

5. The combination according to claim 4 wherein said casing includes a bottom plate which includes said compartment means.

6. The combination according to claim 4 wherein at least a portion of the walls of said compartment means is formed by said closing means.

7. The combination according to claim 4 wherein said casing has an external opening to said compartment means and said closing means comprises plug means secured in said opening and releaseable under the force of said freeze expansion.

8. The combination according to claim 4 wherein said casing has an external opening to said compartment means and said closing means comprises a frangible plate closing off said opening and breakable under the force of said freeze expansion.

9. The combination according to claim 4 wherein said casing is comprised of plastic and said closing means is comprised of metal having a substantially higher heat conductivity than said plastic.

10. The combination according to claim 4 wherein said cavity is closed off by a bottom plate which includes said compartment means and has an external opening to said compartment means and said closing means comprises plug means closing off said opening and releaseable under the force of said freeze expansion.

11. The combination according to claim 4 wherein said cavity is closed off by a bottom plate which includes said compartment means and has an external opening to said compartment means and said closing means comprises a frangible plate closing off said opening and breakable under the force of said freeze expansion.

12. The combination according to claim 4 wherein wall means separate said cavity and said compartment means, said wall means having a relatively small opening between said cavity and said compartment means.

13. In combination with a casing having a cavity for receiving a freeze-expanding fluid, freeze protection means comprising:
  compartment means communicating with said cavity and capable of being opened to the exterior to said casing; and
  means for closing off said compartment means from said exterior having a higher heat conductivity than said casing and adapted to open said compartment means to said exterior upon freezing of said fluid; said casing includes a bottom plate which includes said compartment means.

14. The combination according to claim 13 wherein said bottom plate has an external opening to said compartment means and said closing means comprises a frangible plate closing off said opening and breakable under the force of said freeze expansion.

15. The combination according to claim 13 wherein said bottom plate has an external opening to said compartment means and said closing means comprises plug means closing off said opening and releasable under the force of said freeze expansion.